(12) United States Patent
Wang et al.

(10) Patent No.: US 10,903,779 B2
(45) Date of Patent: Jan. 26, 2021

(54) PHOTOVOLTAIC MODULE UNIT AND PHOTOVOLTAIC ECOLOGICAL GREENHOUSE

(71) Applicant: Suzhou Talesun Solar Technologies Co., Ltd., Jiangsu (CN)

(72) Inventors: Baixing Wang, Jiangsu (CN); Paul Ni, Jiangsu (CN); Zhixiang Xu, Jiangsu (CN); Yayi Hu, Jiangsu (CN); Yu Yan, Jiangsu (CN)

(73) Assignee: Suzhou Talesun Solar Technologies Co., Ltd., Jiangsu (CN)

( * ) Notice: Subject to any disclaimer, the term of this patent is extended or adjusted under 35 U.S.C. 154(b) by 85 days.

(21) Appl. No.: 16/084,943

(22) PCT Filed: May 11, 2016

(86) PCT No.: PCT/CN2016/081661
§ 371 (c)(1),
(2) Date: Sep. 13, 2018

(87) PCT Pub. No.: WO2017/156851
PCT Pub. Date: Sep. 21, 2017

(65) Prior Publication Data
US 2019/0089292 A1    Mar. 21, 2019

(30) Foreign Application Priority Data
Mar. 15, 2016 (CN) .......................... 2016 1 0144650

(51) Int. Cl.
*H02S 10/40* (2014.01)
*H02S 20/10* (2014.01)
(Continued)

(52) U.S. Cl.
CPC ................ *H02S 10/40* (2014.12); *A01G 9/14* (2013.01); *A01G 9/243* (2013.01); *H02S 20/30* (2014.12);
(Continued)

(58) Field of Classification Search
CPC .......... H02S 10/40; H02S 20/30; H02S 40/30; H02S 40/34; A01G 9/14; A01G 9/243
See application file for complete search history.

(56) References Cited

U.S. PATENT DOCUMENTS

| | | | |
|---|---|---|---|
| 2007/0056617 A1* | 3/2007 | Li | ............................ A45B 3/00 135/91 |
| 2014/0259899 A1* | 9/2014 | Poivet | .................... A01G 9/243 47/17 |
| 2015/0214889 A1* | 7/2015 | Nam | ....................... H02S 40/32 136/251 |

FOREIGN PATENT DOCUMENTS

| | | |
|---|---|---|
| CN | 102245979 A | 11/2011 |
| CN | 102474017 A | 5/2012 |

(Continued)

OTHER PUBLICATIONS

International Search Report for Corresponding PCT Application No. PCT/CN2016/081661, dated Dec. 23, 2016 in 7 pages (English translation included).

*Primary Examiner* — Jayne L Mershon
(74) *Attorney, Agent, or Firm* — Knobbe, Martens, Olson & Bear, LLP

(57) ABSTRACT

Disclosed are a photovoltaic module unit and a photovoltaic ecological greenhouse, which are convenient for power transmission and the moving and disassembling of the photovoltaic module unit. The photovoltaic ecological greenhouse comprises a supporting frame, and photovoltaic module unit mounted on the supporting frame, the photovoltaic module unit comprises a bracket and a photovoltaic (Continued)

module arranged on the bracket, the bracket is movably and detachably arranged on the supporting frame; the photovoltaic module unit further comprises a transmission mechanism arranged on a lower part of the bracket, the transmission mechanism has a first contact point electrically connecting to the photovoltaic module; the supporting frame is provided with a second contact point cooperating with the first contact point; and the first contact point is in contact and electrically connected with the second contact point to output electric energy of the photovoltaic module.

6 Claims, 2 Drawing Sheets

(51) Int. Cl.
    *H02S 40/34*     (2014.01)
    *A01G 9/14*     (2006.01)
    *H02S 20/30*     (2014.01)
    *A01G 9/24*     (2006.01)
    *H02S 40/30*     (2014.01)

(52) U.S. Cl.
    CPC .............. *H02S 40/30* (2014.12); *H02S 40/34* (2014.12); *B64C 2201/00* (2013.01); *Y02A 40/25* (2018.01); *Y02P 60/12* (2015.11)

(56) References Cited

FOREIGN PATENT DOCUMENTS

| | | |
|---|---|---|
| CN | 102904109 A | 1/2013 |
| CN | 202840098 U | 3/2013 |
| CN | 103155172 A | 6/2013 |
| CN | 103635081 A | 3/2014 |
| CN | 204012887 U | 12/2014 |
| CN | 204089706 U | 1/2015 |
| CN | 204190680 U | 3/2015 |
| CN | 204347092 U | 5/2015 |
| CN | 205407698 U | 7/2016 |
| JP | 2008-130902 A | 6/2008 |
| KR | 10-2012-0007156 A | 1/2012 |
| WO | 2017/156851 A1 | 9/2017 |

\* cited by examiner

PHOTOVOLTAIC MODULE UNIT AND PHOTOVOLTAIC ECOLOGICAL GREENHOUSE

CROSS-REFERENCE TO RELATED APPLICATIONS

This application is the U.S. National Phase under 35 U.S.C. § 371 of International Application PCT/CN2016/081661, filed May 11, 2016, which claims priority to Chinese Patent Application No. CN20160144650.2, filed Mar. 15, 2016.

TECHNICAL FIELD OF THE INVENTION

The present disclosure relates to a photovoltaic module unit and a photovoltaic ecological greenhouse.

BACKGROUND OF THE INVENTION

At present, solar photovoltaic modules are applied to absorb solar energy and convert it into electrical energy. The land covered by solar photovoltaic modules has not been effectively utilized. If sunlight can reach under these solar photovoltaic modules, plants such as crops, flowers, Chinese herbal medicines, etc. may be planted below these solar photovoltaic modules, or livestock and poultry and aquatic animals may be cultured below these solar photovoltaic modules, and moreover, if light transmittance can be adjusted according to the different types of animals and plants or the amount of light required for different growth stages, the utilization of sunlight and land will be greatly improved.

One of the measures to adjust the light transmittance is to disassemble and move the photovoltaic modules to change their number or spacing. In the prior art, the power transmission of the photovoltaic modules is generally by means of cables connected to the junction boxes on the backs of the photovoltaic modules to directly output electrical energy of each photovoltaic modules, which is limited by the length of the cables, and the like, and this type of connection makes the photovoltaic modules inconvenient to move or disassemble.

SUMMARY OF THE INVENTION

Aimed at the above-mentioned problems, the purpose of the present disclosure is to provide a photovoltaic module unit and a photovoltaic ecological greenhouse, which are convenient for power transmission and the moving and disassembling of the photovoltaic module unit.

To solve the above technical problems, a technical solution employed by the present disclosure is:

A photovoltaic module unit, comprises a bracket mounted on a supporting frame of a photovoltaic power station or a photovoltaic ecological greenhouse, and a photovoltaic module arranged on the bracket, the photovoltaic module unit further comprises a transmission mechanism arranged on a lower part of the bracket, the transmission mechanism has a first contact point used to contact and electrically connect the supporting frame, and the first contact point is arranged on a lower part of the bracket electrically connecting with the photovoltaic module to output electric energy of the photovoltaic module.

Preferably, the transmission mechanism comprises a metal contact movably arranged on a lower part of the bracket, the first contact point is formed on a first metal contact end portion of the metal contact, and a second metal contact end portion of the metal contact is electrically connected with the photovoltaic module via a conducting wire.

More preferably, the transmission mechanism further comprises a insulating housing, and the insulating housing is hollow and fixedly connected to a lower portion of the bracket, the metal contact is slidably arranged within the insulating housing, a first insulating housing end of the insulating housing is opened with a through hole for the first contact point to protrude out, a second insulating housing end of the insulating housing is opened with a through hole for the conducting wire to protrude out, and an elastic element is provided between the insulating housing and the metal contact to provide elastic force for the protruding of the metal contact.

Another technical solution employed by the present disclosure is:

A photovoltaic ecological greenhouse, comprises a supporting frame arranged on the ground to form support, and one or more photovoltaic module units mounted on the supporting frame, the photovoltaic module unit comprises a bracket and a photovoltaic module arranged on the bracket, the bracket is movably and detachably arranged on the supporting frame, the photovoltaic module unit further comprises a transmission mechanism arranged on a lower portion of the bracket, the transmission mechanism has a first contact point arranged on the a part of the bracket electrically connecting with the photovoltaic module, the supporting frame is provided with a second contact point cooperating with the first contact point arranged on the supporting frame, and the first contact point is in contact and electrically connected with the second contact point to output electric energy of the photovoltaic module when the photovoltaic module unit is mounted in place.

Preferably, the transmission mechanism comprises a metal contact movably arranged on a lower part of the bracket, the first contact point is formed on a first metal contact end portion of the metal contact, and a second metal contact end portion of the metal contact is electrically connected with the photovoltaic module via a conducting wire.

More preferably, the transmission mechanism further comprises a insulating housing, and the insulating housing is hollow and fixedly connected to a lower portion of the bracket, the metal contact is slidably arranged within the insulating housing, a first insulating housing end of the insulating housing is opened with a through hole for the first contact point to protrude out, a second insulating housing end of the insulating housing is opened with a through hole for the conducting wire to protrude out, and an elastic element is provided between the insulating housing and the metal contact to provide elastic force for the protruding of the metal contact.

Further, the elastic element is a compressed spring arranged between the second metal contact end portion of the metal contact and the second insulating housing end of the insulating housing.

In a specific embodiment, the supporting frame is opened with a sliding slot cooperating with the metal contact, the second contact point is arranged within the sliding slot, and the first end portion of the metal contact is slidably inserted into the sliding slot.

Preferably, the sliding slot is provided with a guiding slope therein, and the guiding slope aslant extends from a first end portion of the sliding slot to the second contact point in a manner that gradually away from the bracket.

More preferably, there are two guiding slopes and the two guiding slopes are located at two opposite sides of the second contact point, respectively.

Due to the implementation of the above technical solutions, the present disclosure has the following advantages over the prior art: By arranging contact points on the bracket of the photovoltaic module unit, and by contacting and electrically connecting the contacts on the bracket with the supporting frame to output electrical energy of the photovoltaic modules, the photovoltaic module unit may be freely move on the supporting frame or be disassembled, which is not limited by the length of the cable, such that the number of the photovoltaic modules of the photovoltaic ecological greenhouse is adjustable, and may be accurately adjusted according to the optimum amount of irradiation required by the crop.

1—supporting frame; 11—guide rail; 12—sliding slot; 120—second contact point; 121—first guiding slope; 122—second guiding slope; 13—second conducting wire; 130—second connector;

2—photovoltaic module unit; 21—bracket; 22—photovoltaic module;

210—insulating housing; 211—metal contact; 2110—first contact point; 212—first conducting wire; 213—first connector; 214—compression spring.

DETAILED DESCRIPTION OF EXEMPLARY EMBODIMENTS

In the following, the preferable embodiments of the present invention are explained in detail combining with the accompanying drawings so that the advantages and features of the present invention can be easily understood by the skilled persons in the art.

Figure 1:
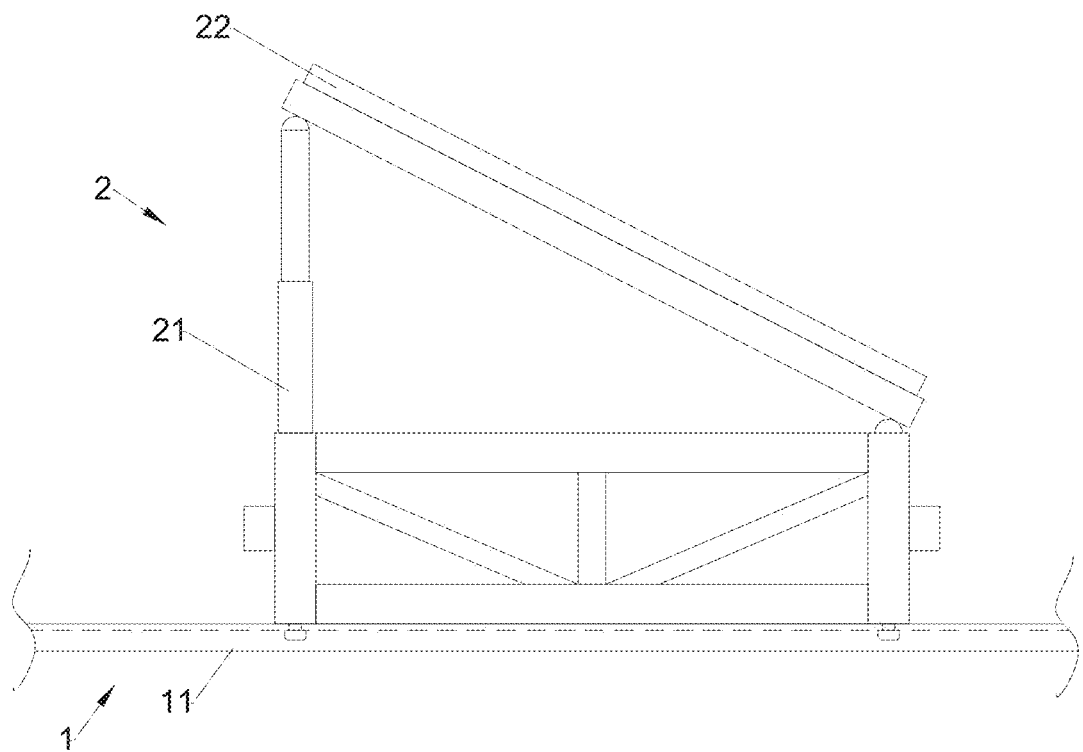
FIG. 1 is a schematic partial diagram of a photovoltaic ecological greenhouse of the present invention.

Referring to FIG. 1, a photovoltaic ecological greenhouse comprises a supporting frame 1, and one or more photovoltaic module units 2. A lower portion of the supporting frame 1 is fixedly arranged on the ground to form support, and the photovoltaic module unit 2 is mounted on an upper portion of the supporting frame 1. The photovoltaic module unit 2 comprises a bracket 21 movably and detachably arranged on the supporting frame 1 and a photovoltaic module 22 arranged on the bracket 21. The photovoltaic module unit 2 further comprises a transmission mechanism arranged on a lower portion of the bracket 21 to output electrical energy generated by the photovoltaic module 22.

Figure 2:
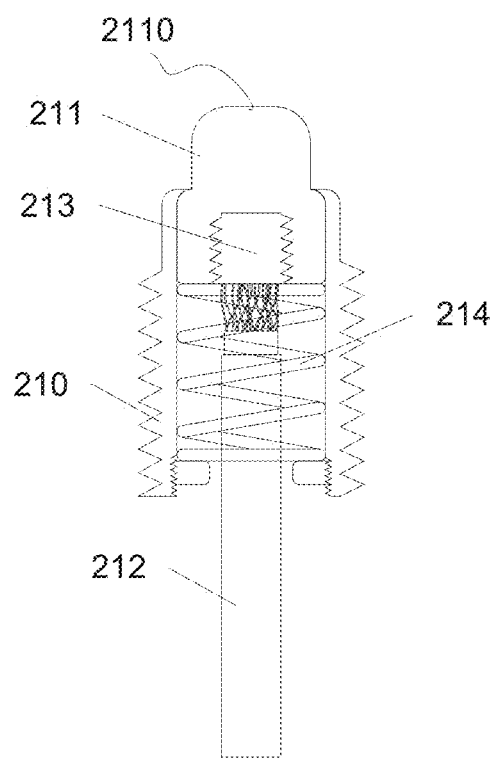
FIG. 2 is a schematic structural diagram of a transmission mechanism of the present invention.
Figure 3:
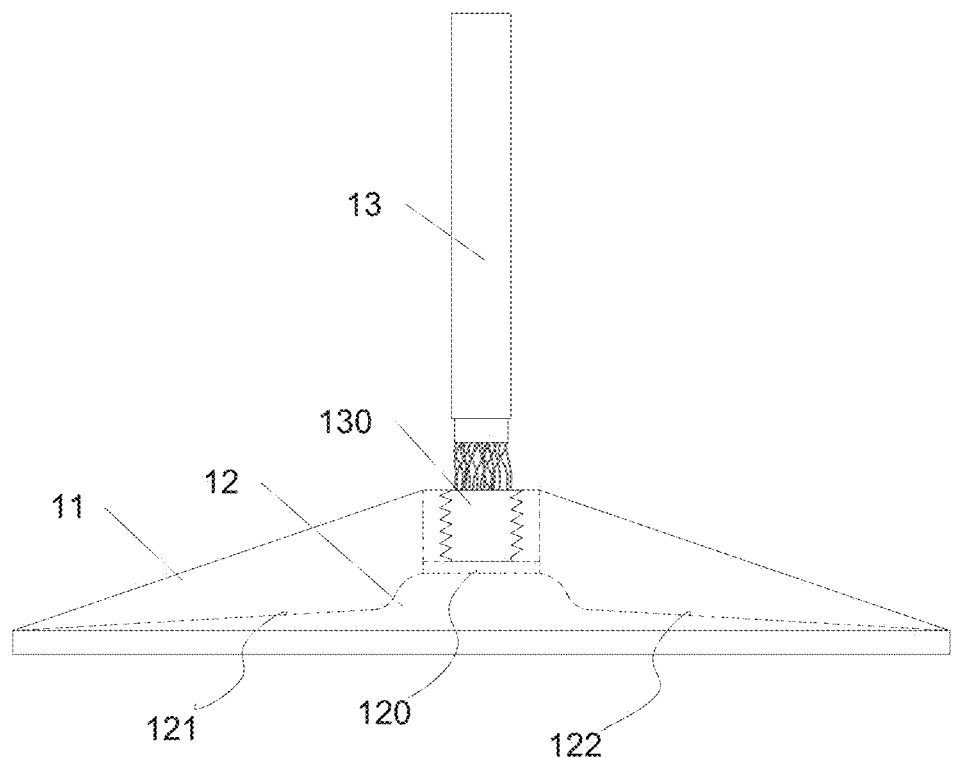
FIG. 3 is a schematic structural diagram of a sliding slot of the present invention.
Figure 4:
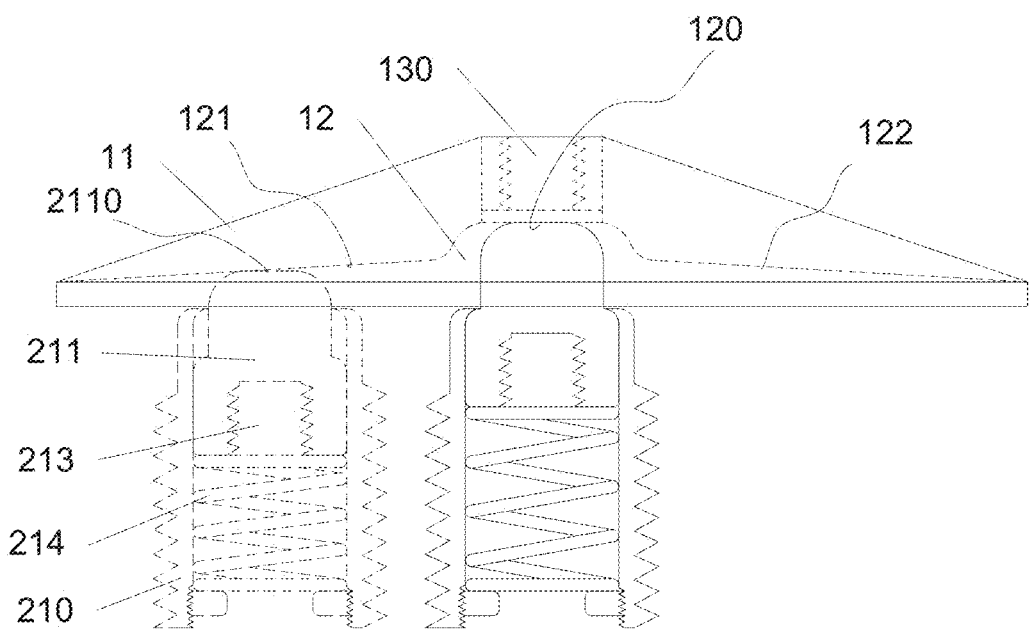
FIG. 4 is a schematic diagram of the operation within the sliding slot of a metal contact of the present invention.

Referring to FIGS. 2-4, the transmission mechanism comprises a insulating housing 210, and the insulating housing 210 is hollow and fixedly connected to a lower portion of the bracket 21, and a metal contact 211 movably arranged within the insulating housing 210. A first metal contact end portion of the metal contact 211 has a first contact point 2110, and a second contact end thereof is electrically connected with a first conducting wire 212. A first insulating housing end of the insulating housing 210 is opened with a through hole for the first contact point 2110 to protrude out, and a second end thereof is opened with a through hole for the first conducting wire 212 to protrude out. An elastic element is provided between the metal contact 211 and the insulating housing 210 to drive the metal contact 211 to slide with respect to the insulating housing 210, and in particular, the second insulating housing end of the insulating housing 210 is fixedly connected with a fastening ring plate, a compression spring 214 is arranged between the second metal contact end portion of the metal contact 211 and the second end of the metal ring plate to drive the metal contact 211 to move, and the compression spring 214 is in a compressed state to provide an elastic force for the protruding of the first contact point 2110. A first wire end portion of the first conducting wire 212 is fixedly connected with a first connector 213, the first connector 213 is opened with thread, the second metal contact end portion of the metal contact 211 is opened with a threaded hole cooperating with the thread, and the first connector 213 is connected with the metal contact 211 via the thread. A second wire end portion of the first conducting wire 212 is electrically connected with the junction boxes of the photovoltaic modules 22.

The supporting frame 1 has a plurality of guide rails 11 for load bearing the brackets 21 and for the brackets 21 to slide, and the guide rail 11 is provided with a plurality of sliding slots 12 at intervals thereon cooperating with the metal contact 211. Bottoms of the sliding slots 12 are provided with second contact points 120 cooperating with the first contact points 2210. Specifically, a first wire end portion of a second conducting wire 13 is fixedly connected with the second connector 130, the second connector 130 is opened with thread, the second connector 130 is connected with the guide rail 11 via the thread, an end portion of the second connector 130 extends to the bottom of the sliding slot 12, the second contact point 120 is formed at a connector end portion of the second connector 130, and a second wire end of the second conducting wire 13 is connected with an external power grid. The first metal contact end portion of the metal contact 211 is slidably inserted into the sliding slot 12, and the photovoltaic module unit 2 is mounted in place when the first contact point 2110 is in contact and connected with the second contact point 120.

The sliding slot 12 is provided with guide slopes 121 and 122 therein, and the guide slopes 121 and 122 aslant extends from an end portion of the sliding slot 12 to the second contact point 120 in a manner that gradually away from the bracket 21. There are two guide slopes, first guide slope 121 and second guide slope 122, located at two opposite sides of the second contact point 120, respectively. As the photovoltaic module unit 2 slides on the guide rail 11, the metal contact 211 is inserted into the sliding slot 12, and under the action of the first guide slope 121 on one side, the compression spring 214 is gradually released and pushes the metal contact 211 to slide outward, and when moving to the second contact 120, the first contact 2110 and the second contact 120 are in abutting contact with each other to achieve electrical connection, the photovoltaic module unit 2 is mounted in place, the electrical energy generated by the photovoltaic module 22 is output via the first conducting wire 212 and the second conducting wire 13; when the photovoltaic module unit 2 needs to be removed, the photovoltaic module unit 2 continues to move along the guide rail 11, and under the action of the second guiding slope 122 on the other side, the metal contact 211 is gradually retracted inside the insulating housing 210, and the compression spring 214 is compressed.

The embodiments described above are only for illustrating the technical concepts and features of the present invention, are preferable embodiments, and are intended to make those skilled in the art being able to understand the present invention and thereby implement it, and should not be concluded to limit the protective scope of this invention. Any equivalent variations or modifications according to the spirit of the present disclosure should be covered by the protective scope of the present disclosure.

The invention claimed is:

1. A photovoltaic greenhouse, comprising a supporting frame arranged on ground, and one or more photovoltaic module units mounted on the supporting frame, the photovoltaic module unit comprising a bracket and a photovoltaic module arranged on the bracket, wherein, the bracket is movably and detachably arranged on the supporting frame; the photovoltaic module unit further comprises a transmission mechanism, the transmission mechanism has a first contact point arranged on a lower part of the bracket electrically connecting with the photovoltaic module, wherein, the transmission mechanism comprises a metal contact movably arranged on a lower part of the bracket, the first contact point is formed on a first metal contact end portion of the metal contact, and a second metal contact end portion of the metal contact is electrically connected with the photovoltaic module via a conducting wire, the supporting frame is provided with a second contact point cooperating with the first contact point, and the first contact point is in contact and electrically connected with the second contact point to output electric energy of the photovoltaic module when the photovoltaic module unit is mounted in place.

2. The photovoltaic greenhouse according to claim 1, wherein, the transmission mechanism further comprises a insulating housing, and the insulating housing is hollow and fixedly connected to a lower portion of the bracket, the metal contact is slidably arranged within the insulating housing, a first insulating housing end of the insulating housing is opened with a through hole for the first contact point to protrude out, a second insulating housing end of the insulating housing is opened with a through hole for the conducting wire to protrude out, and an elastic element is provided between the insulating housing and the metal contact to provide elastic force for the protruding of the metal contact.

3. The photovoltaic greenhouse according to claim 2, wherein, the elastic element is a compressed spring arranged between the second metal contact end portion of the metal contact and the second insulating housing end of the insulating housing.

4. The photovoltaic greenhouse according to claim 1, wherein, the supporting frame has a guide rail for load bearing the bracket and for the bracket to slide, and the guide rail is provided with a sliding slot cooperating with the metal contact, the second contact point is arranged within the sliding slot, and the first metal contact end portion of the metal contact is slidably inserted into the sliding slot.

5. The photovoltaic greenhouse according to claim 4, wherein, the sliding slot is provided with a guiding slope therein, and the guiding slope aslant extends from a first end portion of the sliding slot to the second contact point in a manner that gradually away from the bracket.

6. The photovoltaic greenhouse according to claim 5, wherein, there are two guiding slopes and the two guiding slopes are located at two opposite sides of the second contact point, respectively.

* * * * *